US009533439B2

(12) United States Patent
Michiyama et al.

(10) Patent No.: US 9,533,439 B2
(45) Date of Patent: Jan. 3, 2017

(54) RESIN-MOLDED COMPONENT AND RESIN-MOLDING MOLD

(75) Inventors: Kazuyuki Michiyama, Ushiku (JP); Jun Naganuma, Bangkok (TH)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 13/521,711

(22) PCT Filed: Jan. 12, 2011

(86) PCT No.: PCT/JP2011/050799
§ 371 (c)(1),
(2), (4) Date: Jul. 11, 2012

(87) PCT Pub. No.: WO2011/087140
PCT Pub. Date: Jul. 21, 2011

(65) Prior Publication Data
US 2012/0295064 A1    Nov. 22, 2012

(30) Foreign Application Priority Data

Jan. 13, 2010  (JP) ................... 2010-005183

(51) Int. Cl.
| | |
|---|---|
| *B29C 45/00* | (2006.01) |
| *H04N 1/00* | (2006.01) |
| *B29L 31/00* | (2006.01) |
| *B29C 45/37* | (2006.01) |
| *H04N 1/10* | (2006.01) |

(52) U.S. Cl.
CPC ....... *B29C 45/0025* (2013.01); *B29C 45/0046* (2013.01); *H04N 1/00519* (2013.01); *H04N 1/00551* (2013.01); *B29C 45/372* (2013.01); *B29L 2031/767* (2013.01); *H04N 1/10* (2013.01); *H04N 2201/0422* (2013.01); *Y10T 428/24479* (2015.01)

(58) Field of Classification Search
CPC ............ B29C 45/0025; B29C 45/0046; B29C 45/372; B29C 45/34; H04N 1/00551; H04N 2201/0422; Y10T 428/24479; B29L 2031/767
USPC .................................................. 428/141, 156
See application file for complete search history.

(56) References Cited

U.S. PATENT DOCUMENTS 2,711,900 A  *  6/1955  Tressler .................... A63F 7/04
                                                 273/126 R
5,965,221 A  * 10/1999  Messenger ............ B29C 45/372
                                                      428/13

FOREIGN PATENT DOCUMENTS

| CN | 1665661 A | 9/2005 |
|---|---|---|
| CN | 1974175 A | 6/2007 |
| JP | 2001-171455 A | 6/2001 |
| JP | 2005-313427 A | 11/2005 |

(Continued)

*Primary Examiner* — Aaron Austin
*Assistant Examiner* — Alicia Sawdon
(74) *Attorney, Agent, or Firm* — Canon USA, Inc. I.P. Division (57) ABSTRACT

A resin-molded component includes a thin wall portion, and a rib-like projection configured to protrude from a back surface of the thin wall portion. The rib-like projection includes a plurality of plate-like projections arranged to be spaced from one another. Each of the plurality of plate-like projections is arranged such that an angle formed between a line connecting a point on a longer side of a bottom surface thereof to a gate provided in the thin wall portion and the longer side of the bottom surface thereof is within a range from 10 degrees to 80 degrees.

4 Claims, 11 Drawing Sheets

(56) References Cited

FOREIGN PATENT DOCUMENTS

| JP | 2007-008003 A | | 1/2007 |
|---|---|---|---|
| JP | 2009-029252 A | | 2/2009 |
| JP | 2009-045918 A | | 3/2009 |
| JP | 2009045918 A | * | 3/2009 |

* cited by examiner

RESIN-MOLDED COMPONENT AND RESIN-MOLDING MOLD

TECHNICAL FIELD

The present invention relates to a resin-molded component having a rib-like projection that is provided on a back surface of a thin wall portion and, more specifically relates to the rib-like projection shaped to prevent adverse effects, such as a white streak, from occurring on a front surface thereof during injection molding, and a resin-molding mold therefor.

BACKGROUND ART

A rib-like projection is provided on a back surface of a thin wall portion of a resin-molded component to reinforce the thin wall portion or to perform positioning of the component when another component is attached thereto.

When injection-molding is performed, the rib-like projection disturbs a flow of resin injected from an injection gate into a cavity of a mold for forming the thin wall molded-component. This affects a front surface of the thin wall portion of the resin-molded component, which is a front surface of the rib-like projection, so that sometimes, color unevenness, luster unevenness, tarnish, a sink mark or the like occurs thereon.

Japanese Patent Application Laid-Open No. 2001-171455 discusses, as means for avoiding color unevenness, luster unevenness, tarnish, a sink mark and the like, a method for preventing the disturbance of a resin flow by cutting a rib corresponding to a part at which the disturbance of the resin flow occurs during molding. Japanese Patent Application Laid-Open No. 7-276445 discusses a method for providing a space between the intersection part of ribs and a surface on which the ribs are formed, at which the disturbance of resin is likely to occur. Japanese Patent Application Laid-Open No. 2009-29252 discusses a method of setting a thickness of a root portion of a rib to be larger than that of a distal end portion of the rib.

Japanese Patent Application Laid-Open No. 2009-45918 discusses a method for forming a resin-molded component using a mold in which a gas vent is provided in a cavity to form a rib-like projection, and setting a mold temperature to range from 60 degrees centigrade (° C.) to the injection temperature of resin, moreover the thickness of a thin wall portion is set at 2.7 times or more the thickness of the rib-like projection.

However, in recent years, there have been increasing demands in apparatuses for resin-molded components whose outer appearance surfaces are configured as specially designed glossy surfaces, mirror surfaces, and high-quality embossed surfaces, and demands in optical apparatuses for resin-molded components having high-functionality mirror surfaces which reflect images or the like.

However, the methods respectively discussed in Japanese Patent Application Laid-Open Nos. 2001-171455, 7-276445, and 2009-29252 cannot sufficiently obtain effects of suppressing the unevenness and the like on the specially designed outer appearance surface of the thin wall portion.

According to the method discussed in Japanese Patent Application Laid-Open Nos. 2009-45918, if the mold temperature is set higher, it is necessary to set a cooling time longer. Consequently, a molding cycle time becomes longer. If the thickness of the thin wall portion on which a luster surface is formed is set at 2.7 times or more the minimum necessary thickness of the rib, the thickness of the thin wall portion becomes thicker than necessary. Thus, increasing an amount of used resin causes the cost and the weight of a product to increase, and requires longer time for cooling the product. In addition, resin shrinkage continues even after the product is taken out of the mold, so that an amount of the shrinkage is increased. Thus, other problems occur, which are, e.g., change in the total length of the product and that in the amount of warpage thereof. On the other hand, if the thickness of the thin wall portion is set at the necessary minimum amount, it is necessary to reduce the thickness of the rib. Thus, the thickness necessary for the function of the rib cannot be assured. In this case, integral molding of the rib and the thin wall portion should be given up. A member corresponding to the rib should be attached to a molded body by bonding, welding or the like.

Patent Citation 1
Japanese Patent Application Laid-Open No. 2001-171455
Patent Citation 2
Japanese Patent Application Laid-Open No. 2009-29252
Patent Citation 3
Japanese Patent Application Laid-Open No. 2009-45918

DISCLOSURE OF INVENTION

The present invention prevents occurrence of color unevenness, luster unevenness, tarnish, or the like on the front surface of a thin wall portion having a rib-like projection provided on the back surface thereof. The present invention can form a specially designed resin-molded component.

According to an aspect of the present invention, a resin-molded component includes a thin wall portion, and a rib-like projection configured to protrude from a back surface of the thin wall portion. The rib-like projection includes a plurality of plate-like projections arranged to be spaced from one another. Each of the plurality of plate-like projections is arranged such that an angle formed between a line connecting a point on a longer side of a bottom surface thereof to a gate provided in the thin wall portion and the longer side of the bottom surface thereof is within a range from 10 degrees to 80 degrees.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 4A:
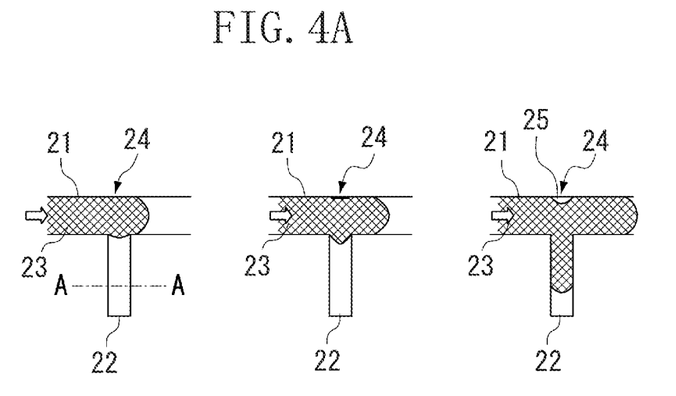
FIGS. 4A and 4B are cross-sectional views illustrating a case where a resin flow is perpendicular to a rib-like projection.
Figure 4B:
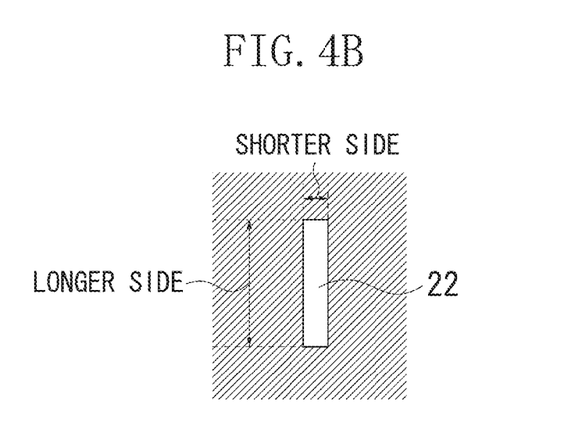

FIGS. 4A and 4B are schematic cross-sectional views of a cavity in a conventional resin-molding mold for forming a resin-molded component. As illustrated in FIG. 4A, space-part 21 is a thin wall portion of the cavity for forming a thin wall portion of the resin-molded component, and space-part 22 is a rib-like projection of the cavity for forming a rib-like projection to be provided in the back surface of the thin wall portion of the resin-molded component. Resin 23 is injected from a gate into the cavity of the mold. FIG. 4B is a cross-sectional view taken on line A-A shown in FIG. 4A and illustrates the rib-like projection space-part 22. The rib-like projection space-part 22 has a depth in a direction perpendicular to a plane of paper on which the drawing is described. Each longer side of the rib-like projection space-part 22 is formed to extend in a direction perpendicular to the plane of paper. Each shorter side of the rib-like projection space-part 22 is formed to extend in a direction parallel to the plane of paper.

FIG. 4A is a cross-sectional view of the cavity of the resin-molding mold and illustrates a cross-section of each of the rib-like projection space-part 22 and the thin wall space-part 21. Particularly, FIG. 4A illustrates a cross-sectional view taken on a line perpendicular to the longer side of the rib-like projection space-part 22. As illustrated in FIG. 4A, the resin 23 injected from the gate flows in the thin wall space-part 21 in parallel with the plane of paper. Then, the resin 23 flows into the rib-like projection space-part 22 in a direction indicated by arrows shown in FIG. 4A (i.e., a direction perpendicular to that of the longer side of the rib-like projection space-part 22). When the resin 23 flowing in the direction indicated by arrows in FIG. 4A reaches the rib-like projection space-part 22, a part of the resin 23 starts to fill the rib-like projection space-part 22. At this time, the thickness of the resin 23 abruptly changes, so that a disturbance occurs in the flow of the resin 23. Thus, a resin pressure applied from a thin wall portion front-surface 24 of the resin to be formed as a resin-molded component, which is a resin-molded-component's surface of the front surface of the thin wall space-part 21, becomes low pressure. Consequently, a gas collecting portion 25 is generated to be recessed into the thin wall front-surface 24. When the thickness of the rib-like projection space part 22 (i.e., that of the shorter side) is too thick, a sink mark is generated on the thin wall front surface 24 of the rib-like projection space-part 22 due to molding shrinkage of the resin 23, which is caused when the resin 23 molten at the filling thereof into the cavity is cooled and solidified. Accordingly, the thickness of the rib-like projection space-part 22 should be set at a minimum necessary value. Thus, a part in which the resin pressure is reduced is locally generated. Consequently, the gas in the gas collecting portion 25 cannot completely be removed even when a holding pressure is applied thereto. Due to the remaining gas, the unevenness or the like occurs.

Figure 5:
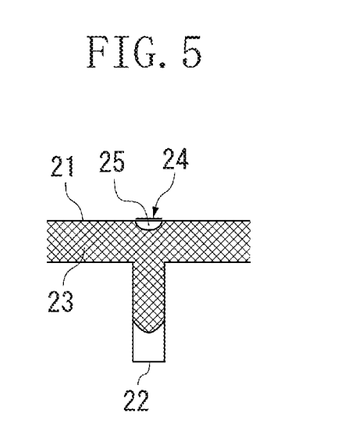
FIG. 5 is a cross-sectional view illustrating a case where a resin flow is parallel to a rib-like projection.

FIG. 5 is a cross-sectional view of a cavity in a resin-molding mold and illustrates a cross-section of each of the rib-like projection space-part and the thin wall space-part. As illustrated in FIG. 5, the resin 23 injected from the gate flows in the thin wall space-part 21. Then, the resin 23 flows into the rib-like projection space-part 22 from a near side of the plane of paper in a direction of the other side thereof (i.e., a direction parallel to the direction of the longer side of the rib-like projection space-part 22). Specifically, the resin 23 injected from the gate flows in a narrow space of the thin wall space-part 21 in the cavity from the near side of the plane of paper to the back side thereof. Then, when the resin 23 reaches the rib-like projection space-part 22, a part of the resin 23 starts fills the rib-like projection space-part 22. At this time, the thickness of the resin 23 abruptly changes, so that a disturbance occurs is the flow of the resin 23. Thus, a resin pressure applied from a thin wall front-surface 24 of the resin to be formed as a resin-molded component, which is a resin-molded-component's surface of the front surface of the thin wall space-part 21, becomes low pressure. Consequently, a gas collecting part 25 is generated to be recessed into the thin wall front-surface 24. Because the thickness of the rib-like projection space-part 22 is thin (i.e., that of the shorter side is short), a part in which the resin pressure is reduced is locally generated. Consequently, the gas in the gas collecting part 25 cannot completely be removed even when a holding pressure is applied thereto. Due to the remaining gas, the unevenness or the like occurs.

Thus, according to the present invention, the resin 23 injected from the gate is set to flow into the rib-like projection space-part 22 obliquely to the direction of the longer side thereof. Accordingly, the unevenness generated on the thin wall front-surface 24 is alleviated.

Figure 6:
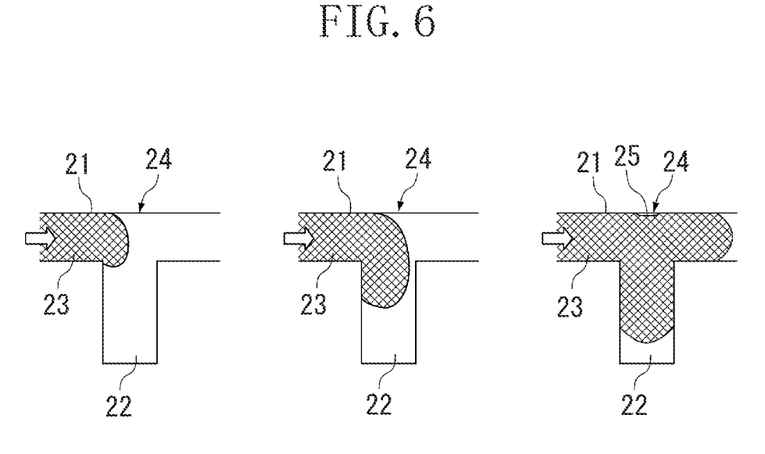
FIG. 6 is a cross-sectional view illustrating a case where a resin flow is oblique to a rib-like projection.

FIG. 6 are cross-sectional views of the cavity of the resin-molding mold. Particularly, FIG. 6 illustrates a cross-section of each of the rib-like projection space-part 22 and the thin wall space-part 21. Each cross-section illustrated in FIG. 6 intersects with the longer side of the rib-like projection space-part 22 at an angle of 30 degrees. The angle at which the cross-section thereof intersects with the longer side is not limited to 30 degrees. As illustrated in FIG. 6, the resin 23 injected from the gate flows in parallel to the plane of paper into the rib-like projection space-part 22 from a direction oblique to the direction of the longer side of the rib-like projection space-part 22 (i.e., a direction of an angle of 30 degrees with respect to the longer side of the rib-like projection space-part 22). Specifically, as illustrated in FIG. 6, the resin 23 injected from the gate flows in a narrow space of the thin wall portion space-part 21 of the cavity. When the resin 23 reaches the rib-like projection space-part 22, as indicated by an arrow illustrated in FIG. 6, a part of the resin 23 starts to fill the rib-like projection space-part 22. However, because the resin 23 flows into the rib-like projection space-part 22 from a direction of an angle of 30 degrees with respect to the direction of the longer side thereof, a thickness of a rib-like projection in the resin flow direction is thick. Accordingly, a part in which the resin pressure applied from the thin wall front-surface 24 of the resin to be formed as a resin-molded component, which is a resin-molded-component's surface of the front surface of the thin wall space-part 21, is reduced is not locally generated. In addition, a reduction in the pressure is small. Thus, the concave gas collecting part 25 is hard to be generated in the thin wall front-surface 24.

Next, a first exemplary embodiment for implementing a resin-molded component according to the present invention is described hereinafter. A multifunction printer having a document reading apparatus is described as an exemplary example with reference to the drawings.

Figure 1:
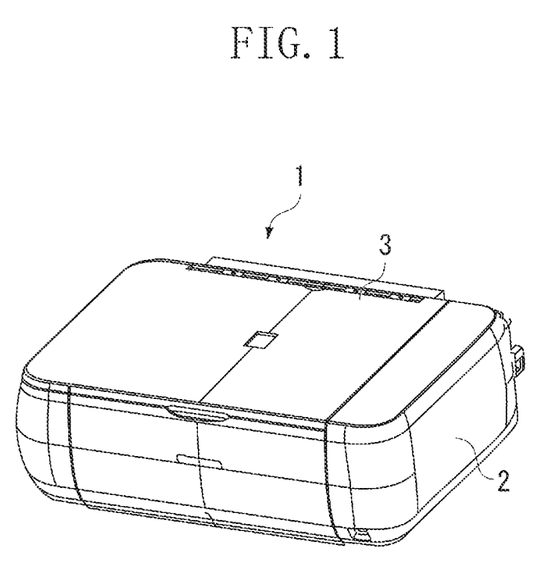
FIG. 1 is a perspective view of a multifunction printer having a document reading apparatus to which the present invention is applied.

FIG. 1 is a perspective view of a multifunction printer having a document reading apparatus to which the present invention is applied. A multifunction printer 1 includes a housing 2 and a document cover 3 which are molded with black resin. A front surface of the printer 1 is a mirror surface. Although the front surface of the printer 1 according to the present exemplary embodiment is a mirror surface, similar advantages can be obtained using other surfaces, e.g., a specially designed luster surface or a high-quality embossed surface as the front surface of the printer 1. The document cover 3 is formed of a thin wall resin-molded component having a rib-like projection on a back surface thereof. The present invention is applied to the document cover 3.

Figure 2:
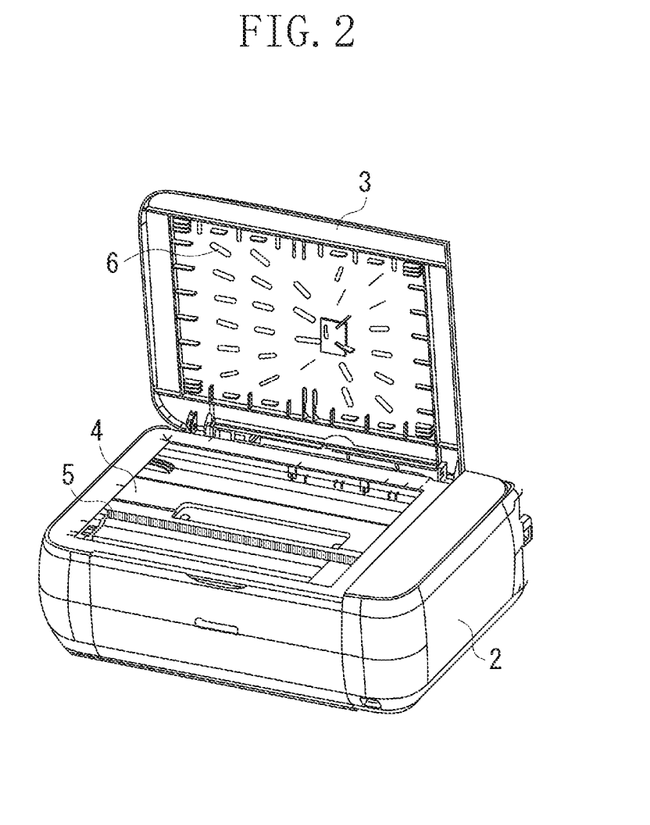
FIG. 2 is a perspective view of a state in which a document cover to which the present invention is applied is opened.

FIG. 2 is a perspective view of the back surface of the document cover 3 in an opened state. A printer mechanism (not shown) is arranged at a lower part of the body housing 2. The document reading apparatus is arranged at an upper part of the body housing 2. A rack apparatus 5 is provided at a lower part of a platen 4 made of glass. When a document is read, an image sensor (not shown) is caused to scan the document along the rack apparatus 5. Thus, the document is read. The document is put on the platen 4 such that a reading surface thereof faces down. Then, the document cover 3 is closed to closely attach the document to the platen 4 without space therebetween.

A plurality of rib-like projections 6 are provided on a surface of the document cover 3, which faces the platen 4. An urethane foam side of a document pressing pad formed by sticking a white polyethylene terephthalate (PET) sheet to the urethane foam (not shown) is attached to distal ends of the plurality of rib-like projections 6 with a double-sided adhesive sheet or the like. The document pressing pad is configured so that the area of the document pressing pad to be larger than that of a reading target document to enable the document pressing pad to press whole area of the document. When the document is read, the document is placed on the platen 4. Then, the document cover 3 is closed. Thus, the document is attached by the document pressing pad closely to the platen 4 without space therebetween. Accordingly, the document can be read by focusing on the entire surface thereof without unevenness. A plane formed by the distal ends of the plurality of rib-like projections 6 is substantially parallel to the platen 4. In addition, the plurality of rib-like projections 6 are arranged substantially at uniform intervals to be able to evenly press the document pressing pad against the platen 4.

Figure 3:
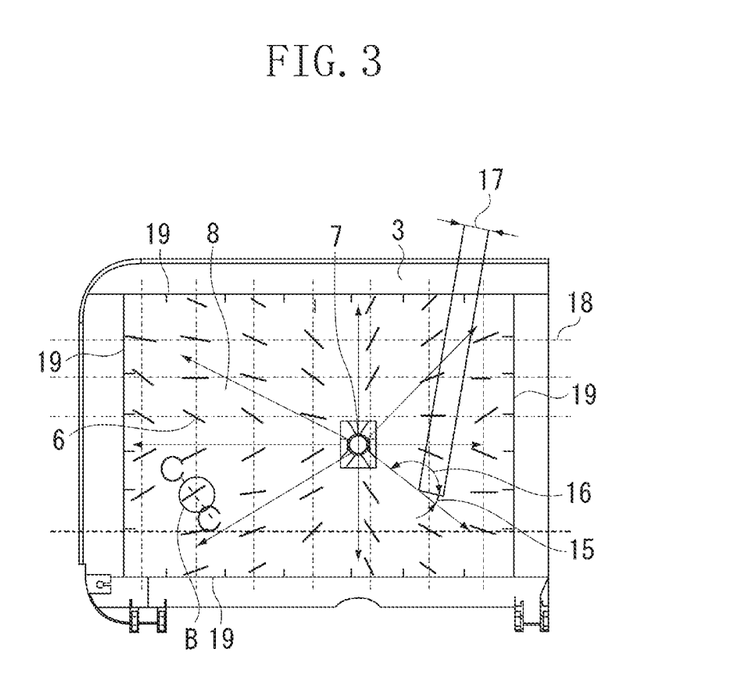
FIG. 3 is a plan view of a first exemplary embodiment of the document cover to which the present invention is applied.

Next, the document cover 3 to which the present invention is applied is described hereinafter with reference to FIG. 3. FIG. 3 is a plan view of a plane facing the platen 4.

A thin wall portion 8 of a resin-molded component illustrated in FIG. 3 is a thin wall of the document cover 3 according to the present exemplary embodiment. A gate 7 for injecting, when the injection molding of the document cover 3 is performed, molten resin is provided substantially at a central part of the thin wall portion 8 of the document cover 3 according to the present exemplary embodiment. Resin injected from the gate 7 flows on the thin wall portion 8 of the document cover 3 radially around a gate position as indicated by arrows in FIG. 3.

The thin wall portion 8 is provided with a plurality of rib-like projections 6 for evenly holding the document pressing pad to be planar. Specifically, rib-like projections 6 are provided as a plurality of divided rib-like projections. The plurality of rib-like projections 6 are spaced at a constant interval from one another and directed to different directions, respectively. Sometimes, a white streak is generated on the surface of the thin wall portion 3 due to destabilization of the resin flow, which is caused by change in molding-conditions or the like. According to the present exemplary embodiment, the rib-like projections 6 are provided as a plurality of divided ones having appropriate lengths. In addition, the plurality of rib-like projections 6 are arranged to be spaced from one another. Thus, the white streak can be less noticeable.

Figure 11A:
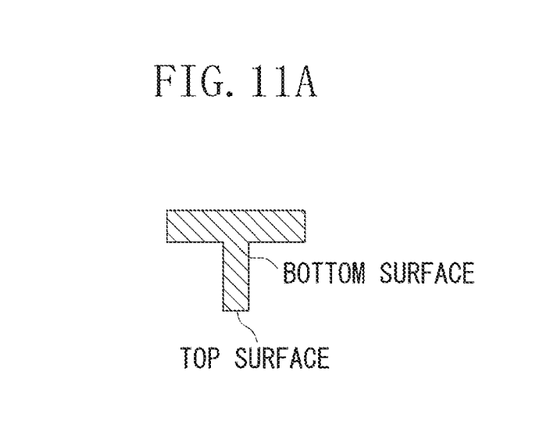
FIGS. 11A and 11B are schematic views of a plate-like projection.
Figure 11B:
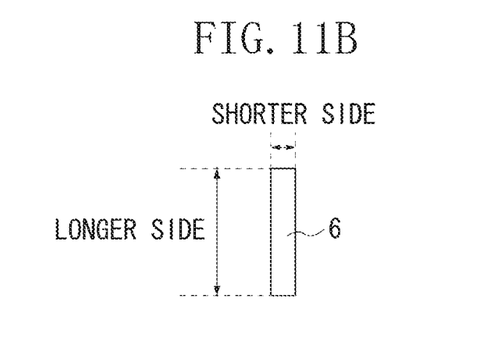

Next, the rib-like projection 6 is described with reference to FIGS. 11A and 11B. FIG. 11A is a cross-sectional view taken on line C-C shown in FIG. 3 and illustrates the rib-like projection 6 in an encircled B-portion in FIG. 3. FIG. 11B is a top view of the rib-like projection 6. As is seen from FIGS. 11A and 11B, a plate-like projection is formed to protrude from the thin wall portion such that a cross-section thereof has a rectangular shape having longer sides and shorter sides. In the present specification, the plate-shaped rib-like projection 6 is referred to as the plate-like projection. Across-section of a root portion (i.e., a portion of the plate-like projection, which is in contact with the thin wall portion) of the plate-like projection is referred to as a bottom surface. A surface of the plate-like projection, which is opposite to the bottom surface thereof, is referred to as a top surface. Plate-like projections are formed as the divided rib-like projections 6. Thus, the plate-like projections 6 can be arranged to be directed in different directions, respectively. Specifically, an angle formed between a resin flow direction and each of the longer sides of all of the plate-like projections 6 can be maintained within a predetermined angle range.

Preferably, a length 17 of the longer side is equal to or longer than 10 millimeters (mm) and equal to or shorter than 30 mm in view of visual quality of surfaces (design surfaces) of a molded component and assurance of the function thereof serving as a rib. When the present exemplary embodiment is used as a document cover, if the length of the plate-like projection 6 is set to be shorter than 10 mm, sometimes, the distal end of a plate-like projection 6 bites into the urethane foam of the document pressing pad. If the length of the plate-like projection 6 is set to be longer than 10 mm, a white streak can occur on the front surface (design surface) of the molded component.

Turning back to FIG. 3, description is continued. At least each plate-like projection 6 formed on a peripheral portion of the gate is arranged such that the angle formed between the resin flow direction and the longer side 17 of the bottom surface is within the predetermined range. The resin flows radially around the gate 7. Thus, the angle formed between the resin flow direction and the longer side of the bottom surface is equal to that formed between the longer side of the bottom surface and a line connecting a point on the longer side of the bottom surface of the plate-like projection 6 to the gate 7. At least the plate-like projections 6 formed on the peripheral portion of the gate 7 are arranged such that the angle formed between a line connecting the point on the longer side of the bottom surface of the plate-like projection 6 to the gate 7 and the longer side of the bottom surface thereof is within a range from 10 degrees to 80 degrees. In the present specification, the term "angle formed between the longer side of the bottom surface and the line" designates an acute-angle-side angle 15. Obviously, if the acute-angle-side angle is 30 degree, an obtuse-angle-side angle 16 is 180 degrees−30 degrees=150 degrees. The angle between the line connecting the point on the longer side of the bottom surface of the plate-like projection 6 to the gate 7 and the longer side of the bottom surface is different depending upon a position of the point on the longer side of the bottom surface of the plate-like projection 6. However, the plate-like projections 6 are arranged such that the angle, more specifically, the acute-angle-side angle 15 between the line connecting the gate 7 to any point on the longer side of the bottom surface of the plate-like projection 6 and the longer side of the bottom surface is within a range from 10 degrees to 80 degrees.

As illustrated in FIG. 3, the plate-like projections 6 are arranged such that each line 18 connecting the centers of the bottom surfaces of the plate-like projections 6 is parallel to associated two of four sides of an outer periphery 19 of the document cover 3. Thus, the document pressing pad can evenly be held. The document pressing pad can evenly be pushed against the platen 4. According to the present exemplary embodiment, the angle of the plate-like projection 6 with respect to the resin flow direction is configured such that an angle between the longer side of the bottom surface of the plate-like projection 6 and a line connecting the gate 7 to a vertex closest to the gate 7, among vertexes of the bottom surface of the plate-like projection 6, is substantially constant. Setting the angle as being constant can facilitate designing of the document cover 3 and implement more even arrangement of plate-like projections 6. Thus, at least in the peripheral portion of the gate 7 illustrated in FIG. 3, adjacent plate-like projections 6 are not parallel to one another. The adjacent plate-like projections 6 are arranged so that angles of the adjacent plate-like projections 6 with respect to each outer peripheral side of the document cover 3 differ from one another.

The plate-like projections 6 are formed such that spacings therebetween range from 20 mm to 40 mm. Deterioration of surface conditions, e.g., occurrence of a white streak, and tarnish can be prevented by providing such spacings. In addition, a reading target document can evenly be pressed against the platen 4 by the document pressing pad.

Thus, each plate-like projection 6 is provided to extend obliquely to the resin flow direction. A gas collecting portion is hard to occur in a front surface portion (thin wall portion front-surface) of the resin to be formed as each resin-molded component, which is opposite to a surface on which the plate-like projections 6 are provided. Consequently, deterioration of the surface conditions of a design surface, e.g., occurrence of a white streak and tarnish, can be prevented.

A second exemplary embodiment for implementing a resin-molded component according to the present invention is described hereinafter with reference to the drawings by describing a multifunction printer having a document reading apparatus as an exemplary example.

Figure 8:
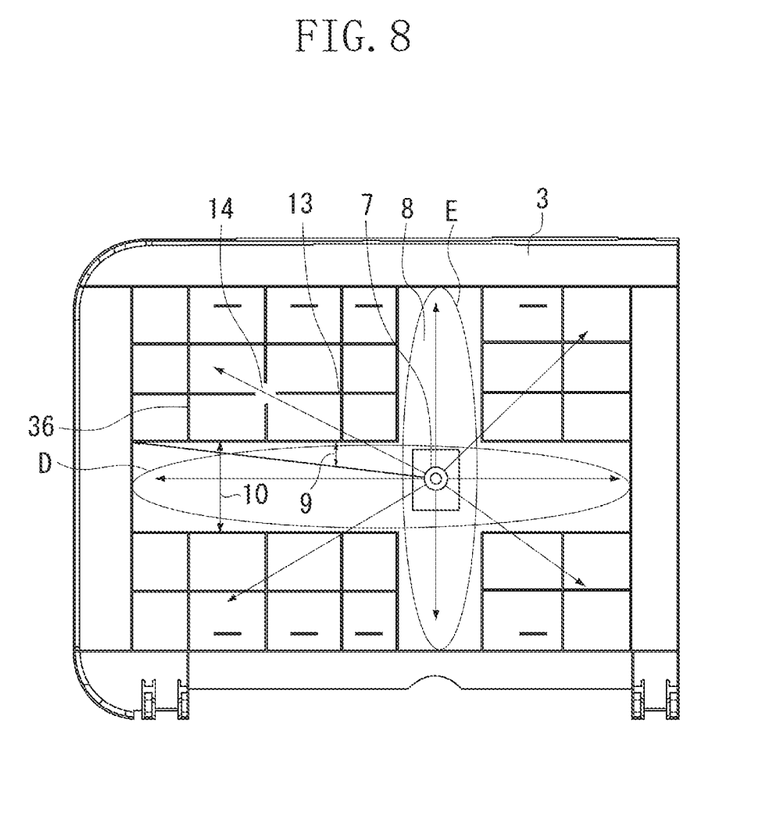
FIG. 8 is a plan view of a third exemplary embodiment of the document cover to which the present invention is applied.

FIG. 8 is a plan view of a surface of the document cover 3 according to the present exemplary embodiment, which faces the platen. The thin wall portion 8 of a resin-molded component according to the present exemplary embodiment is a thin wall of the document cover 3. According to the present exemplary embodiment, the gate 7 from which molten resin is injected into the cavity when injection molding of the document cover 3 is performed is provided at a central part of the thin wall portion 8 of the document cover 3. Resin injected from the gate 7 flows radially around a gate position on the thin wall portion 8 of the document cover 3, as indicated by arrows in FIG. 8. The rib-like projections 36 are arranged like grids extending longitudinally and transversely.

Figure 9:
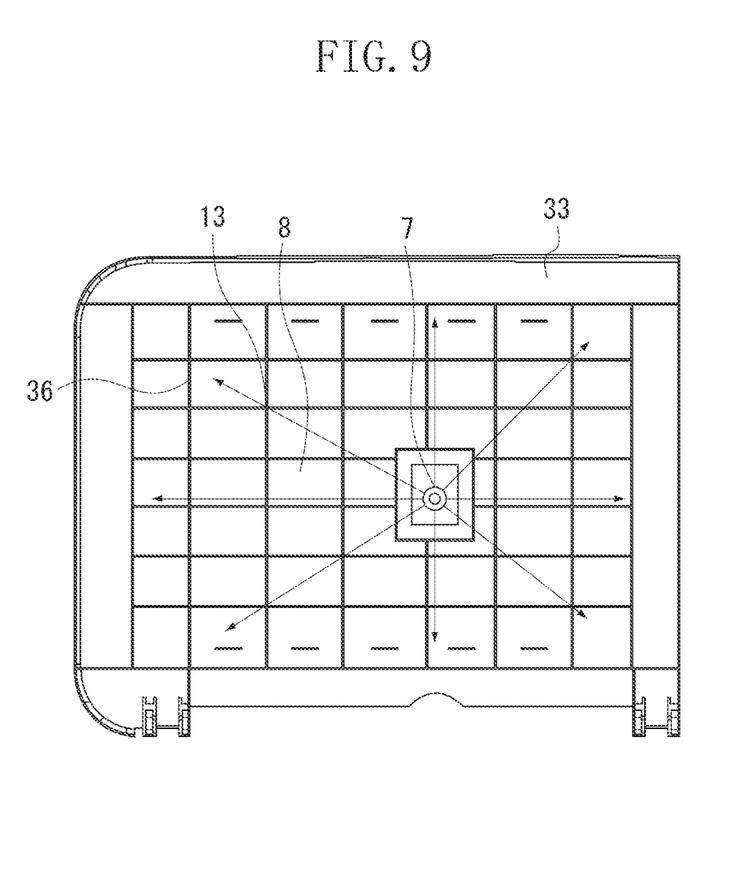
FIG. 9 is a plan view of a conventional document cover.

FIG. 9 is a plan view of a surface of a conventional document cover 33, which faces the platen. Rib-like projections 36 are arranged like grids extending longitudinally and transversely. Description of composing-elements designated with reference numerals also described in FIG. 8 is omitted. The present exemplary embodiment differs from the conventional document cover 33 in that, according to the exemplary embodiment, the rib-like projections are arranged beyond a certain range extending parallel to the rib-like projections 36 and across the gate 7.

The certain range extending parallel to the rib-like projections (i.e., parallel to the grids) and across the gate 7 is a part surrounded by ellipsoids D and E illustrated in FIG. 8. Specifically, the certain range is a region formed, among areas in which rib-like projections 36 are formed, such that no rib-like projections are formed in the region. In the region, the rib-like projections 36 extend substantially perpendicularly or parallel to the resin flow direction. Specifically, the range is such that an acute-angle-side angle formed between a line connecting the gate 7 to each point on the longer side of the bottom surface of each rib-like projection 36 and the longer side of the bottom surface is equal to or less than 10 degrees, or equal to or more than 80 degrees.

For example, if a reading target document size is A4, the necessary length of the longer side of the document cover 3 is equal to or larger than 300 mm. In this case, a distance between the gate 7 to the farthest rib-like projection 36 therefrom is substantially 140 mm. When a minimum angle 9 formed between the rib-like projection 36 and the resin flow direction is 10 degrees, a minimum interval 10 between the rib-like projections 36 is 50 mm (the minimum interval 10=tan 10 (degrees)×140 (mm)×2≈50 (mm)). If the interval is increased too much, the reading target document cannot evenly be pressed against the platen 4 by the document pressing pad. Therefore, preferably, the certain region extending parallel to the rib-like projections (i.e., parallel to the grids) and across the gate 7 is such that the spacing between the regions in each of which the rib-like projections 36 are arranged ranges from 50 mm to 70 mm.

It is effective in maintaining good surface conditions to provide a cutout (see reference numeral 14 in FIG. 8) in the rib-like projections 36 where (see reference numeral 13 in FIG. 8) longitudinal and transversal rib-like projections 36 intersect one another.

A third exemplary embodiment for implementing a resin-molded component according to the present invention is described hereinafter with reference to the drawings by describing a multifunction printer having a document reading apparatus as an exemplary example.

Figure 7:
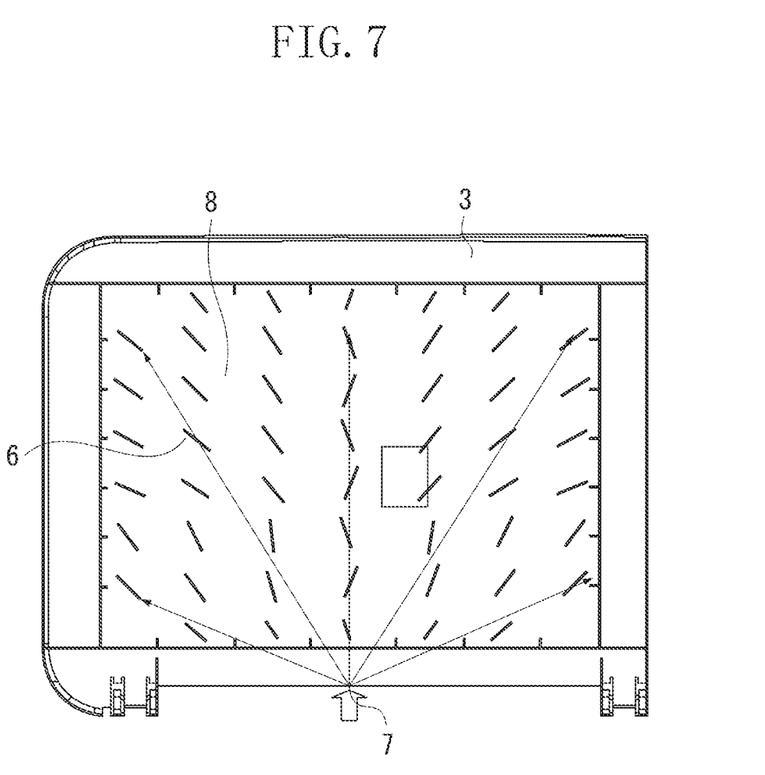
FIG. 7 is a plan view of a second exemplary embodiment of a document cover to which the present invention is applied.

FIG. 7 illustrates a case where the gate 7, from which molten resin is injected when injection molding of the document cover 3 is performed, is provided at a central portion of an outer peripheral side of the thin wall portion 8 of the document cover 3.

As illustrated in FIG. 7, the gate 7 is provided at a substantially central side of a lower side of the document cover 3. Molten resin is injected into the cavity from this portion, as indicated by thick arrows. Similar to the first exemplary embodiment, the injected resin flows on the thin wall portion 8 of the document cover 3 radially from the gate 7, as indicated by arrows. According to the third exemplary embodiment, the gate 7 is provided in the outer peripheral portion of the document cover 3, so that resin flows in fan-like manner.

At least each plate-like projection 6 formed on a peripheral portion of the gate 7 is arranged such that the angle formed between the resin flow direction and the longer side 17 of the bottom surface is within a certain range. At least the plate-like projections 6 formed on the peripheral portion of the gate 7 are arranged such that the angle formed between the point on the longer side of the bottom surface of the plate-like projection 6 and the longer side of the bottom surface thereof is within a range from 10 degrees to 80 degrees. The angle between the line connecting the point on the longer side of the bottom surface of the plate-like projection 6 to the gate 7 and the longer side of the bottom surface differs depending upon the position of the point on the longer side of the bottom surface of the plate-like projection 6. However, the plate-like projections 6 are arranged such that the angle, more specifically, the acute-angle-side angle 15 between the line connecting the gate 7 to any point on the longer side of the bottom surface of the plate-like projection 6 and the longer side of the bottom surface is within a range from 10 degrees to 80 degrees. Similarly to the first exemplary embodiment, preferably, the length of the longer side is equal to or longer than 10 mm and equal to or shorter than 30 mm in view of visual quality of actual design surfaces and assurance of the function of the plate-like projection serving as a rib.

According to the above first through third exemplary embodiments, the present invention is applied to the document cover of the document reading apparatus. However, targets to which the present invention is applied are not limited to the document cover. The present invention can be applied to design surfaces of various apparatuses. The designed surfaces to which the present invention is applied are not limited to a black mirror surface. The present invention can be applied to resin-molded components of deep colors, on the surfaces of which the color unevenness and the white streak are easily noticeable.

The surfaces to which the present invention is applicable are not limited to mirror surfaces. The present invention can be applied to glossy embossed surfaces formed by giving concave-convex patterns on resin surfaces. The surfaces to which the present invention is applied are not limited to design surfaces. The present invention can be applied to resin-molded components whose surfaces are intended to perform optical functions, e.g., a resin image reflection mirror for use in an optical apparatus.

The function of the rib-like projection is not limited to holding the document pressing pad. The present invention can be applied to a reinforcing rib for increasing the strength of the thin wall portion.

In addition, if the present invention is applied not to designed surfaces but to optical function surface, the rib-like projection according to the present invention can be used as a spacer for maintaining a high-precision plane.

Hereinafter, the present invention is more specifically described with reference to examples. However, the present invention is not limited to the following practical exemplary examples.

A first exemplary example according to the present invention is described below. A document cover of an image reading apparatus for reading a document whose reading document size was A4, which had a thin wall portion having black glossy mirror surfaces, was molded. The cavity of a mold was produced such that a basic resin thickness of the thin wall portion was 2.7 mm. The gate position was set in the mold to be deviated about 10% rightwardly from the center of the longer side of the document cover. Then, injection molding was performed by setting the mold temperature at 50° C.

Document covers were produced by changing the relationship between the position of the plate-like projection and the resin flow direction. In addition, the surface conditions of the thin wall portion were observed. According to results of the observation of the surface conditions, visual 5-rank evaluation of the surface conditions was performed by setting evaluation values such that when a white streak was most highly visible, an evaluation value was set at 5, and that when no white streak was noticeable, an evaluation value was set at 0.

Molds satisfying the following relationship between the position of the plate-like projection and the resin flow direction were prepared. Specifically, the molds were prepared, which respectively corresponded to 10 degrees, 20 degrees, 30 degrees, 40 degrees, 45 degrees, 50 degrees, 60 degrees, 70 degrees, and 80 degrees employed as values of the acute-angle-side angle between the longer side of the bottom surface of the plate-like projection and a line connecting the gate to a vertex closest to the gate, among vertexes of the bottom surface of the plate-like projection. Then, injection molding was performed using each of such molds. Thus, the document covers were produced, which differed from one another in the angle between the longer side of the bottom surface of the plate-like projection and the line connecting the gate to the vertex closest to the gate.

Hereinafter, comparative examples are described. Document covers were produced as the comparative examples, which respectively correspond to 5 degrees and 85 degrees employed as the values of the acute-angle-side angle between the longer side of the bottom surface of the plate-like projection and the line connecting the gate to a vertex closest to the gate, among the vertexes of the bottom surface of the plate-like projection. Then, injection molding was performed according to a method similar to the method corresponding to the first exemplary example.

Figure 10:
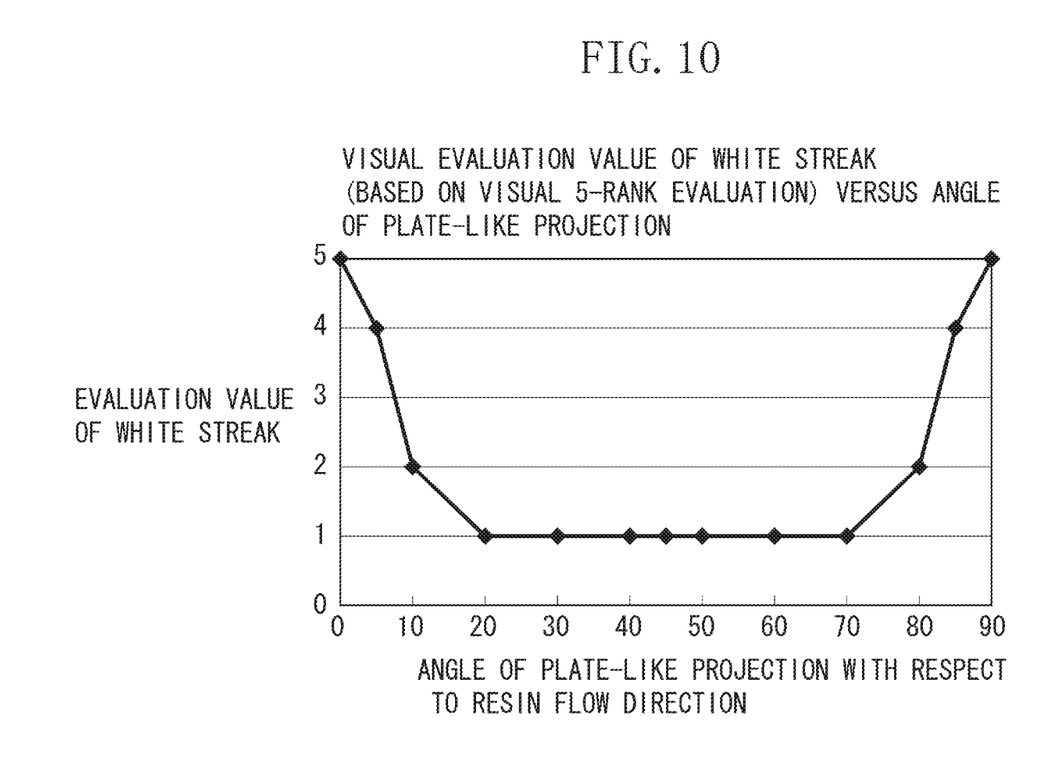
FIG. 10 is a graph illustrating visually obtained white streak data versus an angle of a rib-like projection with respect to a resin flow direction.

FIG. 10 illustrates results of evaluation of the first exemplary example and the comparative examples.

When the angle formed between the plate-like projection and the resin flow direction was within a range from 0 to 5 degrees or a range from 85 degrees to 90 degrees, occurrence of a white streak on the thin wall portion was confirmed.

The white streak generated on the opposite surface of the plate-like projection 6 corresponding to each of 10 degrees and 80 degrees doesn't defile the design. Thus, the generated white streak was tolerable.

When the acute-angle-side angle formed between the plate-like projection and the resin flow direction was close to 30 degrees, the surface conditions were most stable. However, in the range from 10 degrees to 80 degrees, adequate effects of preventing occurrence of a gas collecting part could be confirmed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-005183, filed Jan. 13, 2010, which is hereby incorporated by reference herein in its entirety.

The invention claimed is:

1. A resin-molded component including a thin wall portion having a front surface and a back surface, the front surface including a mirror surface, a luster surface or an embossed surface, and formed by injecting resin from a gate into a cavity, comprising:
    an array of plate-like projections, wherein the plate-like projections are arranged on a plurality of rows that are parallel to one side of an outer periphery of the resin-molded component and a plurality of columns that are parallel to another side of the outer periphery of the resin-molded component;
    wherein each of the plate-like projections protrude from the back surface, wherein a bottom surface of each of the plate-like projections has a longer side and a shorter side, wherein the longer side of each of the plate-like projections is 10 mm or more and 30 mm or less, wherein the plate-like projections are arranged to be spaced from one another,
    wherein each of the plate-like projections has an angle formed between the longer side of the plate-like projections and one row from the plurality of rows in which the plate-like projection is arranged such that each of the plate-like projections for the one row has a different angle,
    wherein an angle formed between a line connecting a point on the longer side of each of the plate-like projections to a position in the thin wall portion corresponding to the gate and the longer side thereof is within a range from 10 degrees to 80 degrees.

2. The resin-molded component according to claim 1, wherein the plurality of plate-like projections are arranged to be spaced from one another at intervals ranging from 20 mm to 40 mm.

3. The resin-molded component according to claim 1, wherein a front surface of the thin wall portion is a mirror surface or an embossed surface.

4. The resin-molded component according to claim 1, including a document cover of a document reading apparatus.

* * * * *